United States Patent [19]
DeBell

[11] Patent Number: 5,847,673
[45] Date of Patent: Dec. 8, 1998

[54] SYSTEM AND METHOD FOR DETERMINING A POSITION OF AN OBJECT USING OUTPUT FROM A RADAR SYSTEM

[75] Inventor: David A. DeBell, Severna Park, Md.

[73] Assignee: Northrop Grumman Corporation, Los Angeles, Calif.

[21] Appl. No.: 680,259

[22] Filed: Jul. 11, 1996

[51] Int. Cl.$^6$ .................................................. G01S 13/90
[52] U.S. Cl. ........................ 342/25; 342/90; 342/140; 342/149; 342/152; 342/191; 342/162
[58] Field of Search ................................ 342/25, 90, 149, 342/152, 191, 195, 140, 141, 162

[56] References Cited

U.S. PATENT DOCUMENTS

| | | | |
|---|---|---|---|
| 4,589,610 | 5/1986 | Schmidt | 244/3.19 |
| 4,837,577 | 6/1989 | Peregrim et al. | 342/80 |
| 4,978,961 | 12/1990 | Williams et al. | 342/25 |
| 5,113,193 | 5/1992 | Powell et al. | 342/25 |
| 5,223,842 | 6/1993 | Okurowski et al. | 342/201 |
| 5,245,347 | 9/1993 | Bonta et al. | 342/149 |
| 5,430,445 | 7/1995 | Peregrim et al. | 342/25 |

*Primary Examiner*—John B. Sotomayor
*Attorney, Agent, or Firm*—Walter G. Sutcliff

[57] ABSTRACT

An inertial navigation system (INS) and a monopulse radar system are mounted on a body. The inertial navigation system outputs at least a velocity of the body. Either a synthetic aperture radar (SAR) map or doppler beam sharpening (DBS) map is created using the outputs of the monopulse radar system. The monopulse radar system outputs at least a summation output, an azimuth difference and an elevation difference associated with an object detected in either the SAR or DBS map. The position processor of the system and method of the present invention, however, only inputs the summation output and one of the azimuth difference and election difference. The position processor determines the other of the azimuth difference and the elevation difference by converting the velocity output by the INS into a doppler angle $\theta$ (the angle between the velocity, a vector, and a line connecting the object and the body) and determining either the azimuth difference or the elevation difference from the doppler angle $\theta$. In this manner, the present invention reduces the number of channels between the monopulse radar system and the position processor. This results in a weight, hardware, and cost savings without a corresponding reduction in performance.

38 Claims, 4 Drawing Sheets

| LINE | ΔAz | ΔEl | ΔAz |
|------|-----|-----|-----|
| LINE | Σ | Σ | Σ |

FIG. 7(b)

| LINE | ΔAz | Σ | ΔAz |
|------|-----|---|-----|
| time: | $t_0$ | $t_0 + t$ | $t_0 + 2t$ |

SYSTEM AND METHOD FOR DETERMINING A POSITION OF AN OBJECT USING OUTPUT FROM A RADAR SYSTEM

BACKGROUND OF THE INVENTION

1. Field of the Invention

The present invention is related to a system and method for determining a position of an object detected by a radar system using output from the radar system; wherein the radar system is mounted on a body such as an aircraft.

2. Description of Related Art

Figure 1:
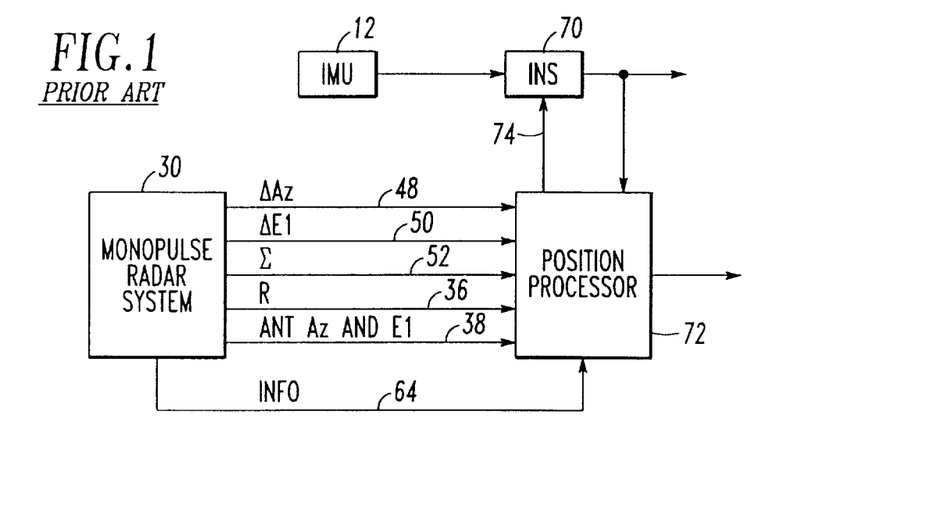
FIG. 1 illustrates a conventional system for determining the position of an object.
Figure 2:
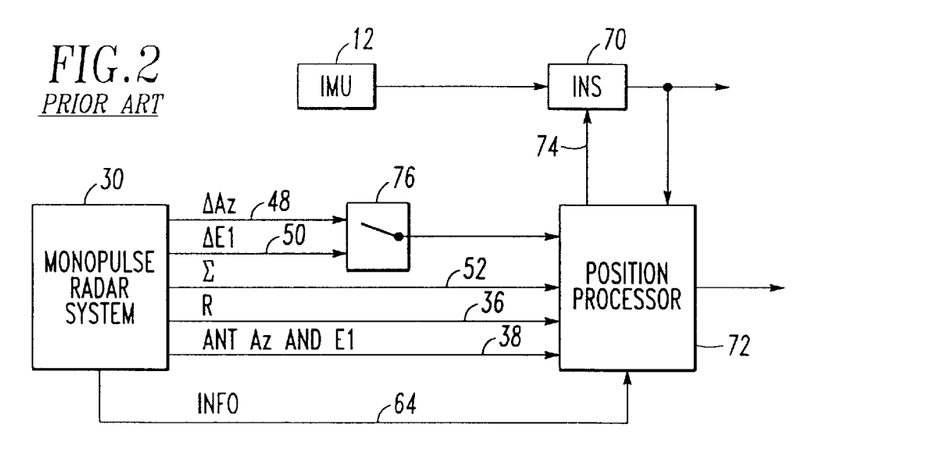
FIG. 2 illustrates another conventional system for determining the position of an object.

FIGS. 1 and 2 illustrate conventional systems mounted on a body, such as an aircraft, for determining a position of an object detected in a doppler beam sharpening (DBS) map or a synthetic aperture radar (SAR) map.

When making location measurements on an object (e.g., a target) detected in a DBS map or a SAR map, monopulse measurements are usually made on the range-doppler cell in the DBS map or SAR map which contains the object. These monopulse measurements are then transformed into antenna coordinates, and the antenna coordinates converted into either body (e.g., aircraft) coordinates or inertial coordinates (i.e., global coordinates).

Typically a user or object detection system identifies the range-doppler cell containing the object of interest. Then, as illustrated in FIG. 1, a monopulse radar system 30 provides monopulse measurements made on the range-doppler cell in the DBS or SAR map containing the object to a position processor 72. Specifically, the monopulse radar system 30 provides the monopulse measurements of a summation output Σ on line 52, an azimuth difference ΔAz on line 48, an elevation difference ΔEl on line 50. The monopulse radar system 30 also outputs a range R to the range-doppler cell containing the object on line 36, antenna boresight azimuth and elevation on line 38, and radar system information on line 64. The radar system information includes the wavelength λ of the output pulse from the monopulse radar system 30, the doppler frequency Fd of the range-doppler cell containing the object, and other known operating parameters of the monopulse radar system 30.

Figure 4:
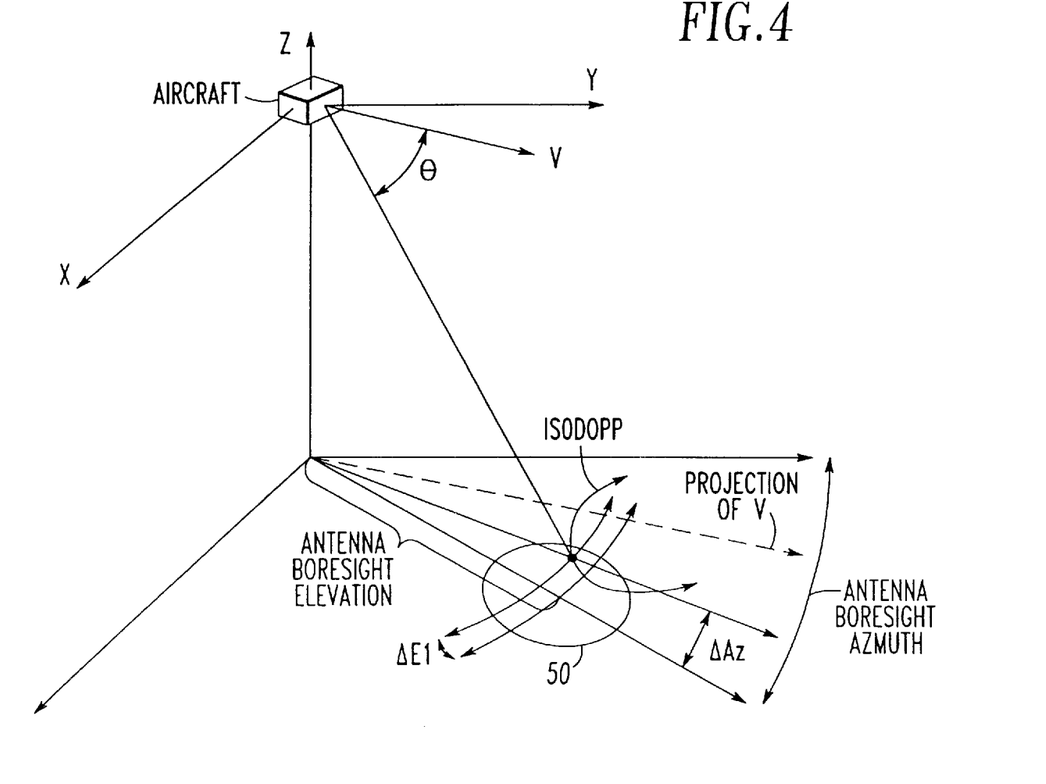
FIG. 4 graphically defines the monopulse measurements made by a monopulse radar system.

FIG. 4 graphically defines the monopulse measurements as well as illustrates the relationship between the object and the body, which, for discussion purposes has been identified as an aircraft. In FIG. 4, the aircraft, shown as a block, has a velocity vector V. As further shown in FIG. 4, the monopulse radar system 30 forms a beam pattern 50 on the ground. While the ground has been chosen for illustration purposes, FIG. 4 applies to any designated range regardless of whether that range coincides with the ground. The crosshairs of the beam pattern 50 represent the antenna boresight azimuth and the antenna boresight elevation. Shown as a dot in the beam pattern 50 in FIG. 4 is the range-doppler cell containing the object. The difference between the antenna boresight azimuth and the azimuth intersecting the range-doppler cell containing the object is the azimuth difference ΔAz. The difference between the antenna boresight elevation and the elevation of the range-doppler cell containing the object is the elevation difference ΔEl. Also illustrated in FIG. 4 is a line connecting the aircraft and the range-doppler cell containing the object which represents the range R. Further illustrated is the doppler angle θ, the angle between the velocity vector and the line connecting the aircraft and the range-doppler cell containing the object. Rotating the line at the doppler angle θ around the velocity vector V forms a cone. The intersection of this cone with, for instance, the ground forms a constant doppler curve Isodopp; wherein every point on Isodopp has the same doppler frequency.

A position processor 72 receives the monopulse measurements, and determines the position of the object (i.e., the range-doppler cell containing the object) in antenna coordinates. The position processor 72 then converts the antenna coordinates into body coordinates (e.g., aircraft coordinates) and/or inertial coordinates. To convert the antenna coordinates to inertial coordinates, the position processor 72 requires knowledge of the body's position in inertial coordinates. An inertial navigation system 70, also mounted on the body, provides the position processor 72 with the position of the body in inertial coordinates.

An inertial measurement unit (IMU) 12 detects the acceleration and rotation of the body in three axes, and provides these measurements to the INS 70. Besides determining the position of the body in inertial coordinates, the INS 70 determines the velocity and acceleration of the body. Unfortunately, the velocity measurements produced by the INS 70 based on the IMU 12 output can be inaccurate. Fortunately, the velocity of the body may also be determined from the doppler angle θ illustrated in FIG. 4 according to the following equation:

$$V = \lambda Fd/2 \cos(\theta) \quad (1)$$

where V is the velocity of the body, λ is the RF wavelength of the output pulse from the monopulse radar system 30, Fd is the doppler frequency of the range-doppler cell containing the object, and θ is the doppler angle. To improve the accuracy of the velocity measurements, the INS 70 receives several doppler angles θ calculated by the position processor 72, the wavelength λ of the output pulse, and the doppler frequency Fd of the range-doppler cell containing the object on line 74. Since the doppler angle θ, the azimuth Az of the range-doppler cell containing the object, and the elevation El of the range-doppler cell containing the object as shown in FIG. 4 have the following relationship:

$$\cos(\theta) = \cos(El)\cos(Az) \quad (2)$$

the position processor 72 can calculate the doppler angle θ from a plurality of azimuth and elevation measurements using the following equation:

$$\theta = \operatorname{Arccos}(\cos(El)\cos(Az)) \quad (3)$$

Figure 7A:
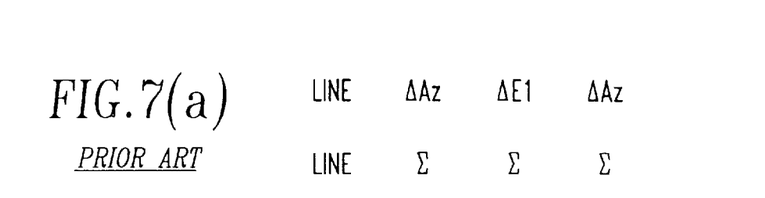

The system illustrated in FIG. 2 differs from the system in FIG. 1 in that the number of processing channels has been reduced by one. The system of FIG. 1 is considered a three channel system with the three channels being the summation output Σ on line 52, the azimuth difference ΔAz on line 48, and the elevation difference ΔEl on line 50. The system of FIG. 2 is a two channel system having a switch 76. The switch 76 is disposed near or forms a part of the monopulse radar system 30. The switch 76 receives the elevation difference ΔEl on line 50 and the azimuth difference ΔAz on line 48, and sequentially and alternately outputs the elevation difference ΔEl and the azimuth difference ΔAz to the position processor 72. FIG. 7(a) illustrates the input timing of the position processor 72 in the system of FIG. 2. As shown in FIG. 7(a), beginning at time $t_o$ the position processor 72 receives inputs, and receives inputs every t seconds. Consequently, the position processor 72 requires two input periods before being able to determine the position of an object.

When creating DBS and SAR maps, the pulse repetition rate (PRF) of the monopulse radar system 30 should be set adequately high to avoid the doppler aliasing which can occur within the beam pattern on the ground. The beam pattern on the ground covers a certain doppler width ($\Delta Fd$) which should be some fraction of the PRF so that doppler fold-over or aliasing does not interfere with the accuracy of the monopulse measurements as set forth by system requirements. Reducing the number of channels as in FIG. 2 through channel sharing requires a higher PRF because of the constant switching between the azimuth difference $\Delta Az$ and the elevation difference $\Delta El$ outputs. This lowers the maximum range of the monopulse radar system, or if the maximum range is maintained, limits performance in terms of doppler angle coverage, the body's velocity, or some other performance parameters. Channel sharing, however, provides the advantages of a system with reduced cost, weight, and power. Accordingly, in applications where these factors dominate, higher performance may be traded for lower cost or weight.

Figure 3:
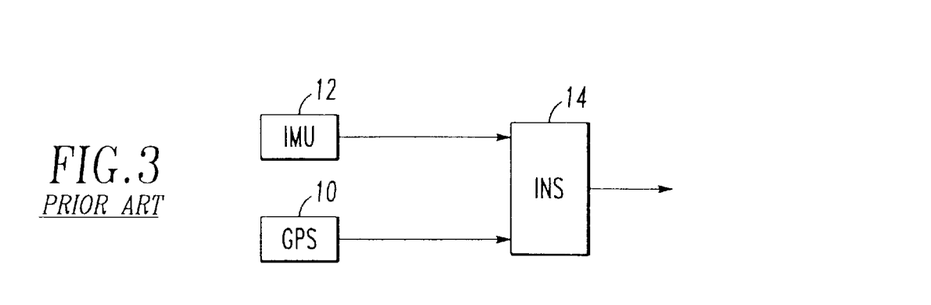
FIG. 3 illustrates a newer, prior art inertial navigation system.

Recently, with the advent of the global positioning system (GPS), the need of the INS 70 for doppler angles $\theta$ from the position processor 72 has been eliminated. As shown in FIG. 3, the new INS 14 receives the output of both the IMU 12 and a GPS 10. The inertial coordinate measurements provided by the GPS 10 allow the INS 14 to produce more accurate velocity and position measurements than those achieved by the prior INS 70.

SUMMARY OF THE PRESENT INVENTION

Desiring to reduce the number of channels without significant sacrifices in performance, the inventor discovered that he could achieve such a result using the accurate velocity measurements produced by the INS. The inventor of the subject application recognized that the accurate velocity measurements produced by the INS could be used to determine accurate doppler angles $\theta$. The inventor further determined that with the doppler angle $\theta$ and with a knowledge of the wavelength $\lambda$ of the output pulse from the monopulse radar system, the doppler frequency Fd of the range-doppler cell, and one of the azimuth difference $\Delta Az$ and the elevation difference $\Delta El$, he could determine the other one of the azimuth difference $\Delta Az$ and the elevation difference $\Delta El$. Accordingly, the inventor developed an object position determining system which only required receipt of one of the azimuth difference $\Delta Az$ and the elevation difference $\Delta El$ from the monopulse radar system.

One object of the present invention is to provide a system and method for determining a position of an object using output from a radar system wherein the number of channels of the radar system may be reduced without a corresponding significant reduction in performance.

A further object of the present invention is to provide a system and method for determining the position of an object using output from a radar system which does not require inputting one of the azimuth difference and the elevation difference from the radar system.

Another object of the present invention is to provide a system and method for determining a position of an object using one of the azimuth difference and elevation difference output from a radar system, and determining the other of the azimuth difference and elevation difference based on the doppler frequency of the range-doppler cell in which the object is located.

These and other related objectives are achieved by providing a method of determining a position of an object using output from a radar system mounted on a body, comprising (a) inputting a velocity vector of said body; (b) inputting a summation output associated with said object from said radar system; (c) inputting one of an azimuth difference and an elevation difference associated with said object from said radar system; (d) converting said velocity vector into a parameter representing a relationship between said body and said object; and (e) determining a position of said object from said summation output, said input one of said azimuth difference and said elevation difference, and said parameter.

These and other related objectives are further achieved by providing a method of determining a position of an object using output from a radar system mounted on a body, comprising: (a) inputting a velocity vector of said body from an inertial navigation system; (b) inputting a summation output associated with said object from said radar system; (c) inputting one of an azimuth difference and an elevation difference associated with said object from said radar system; (d) calculating one of said azimuth difference and said elevation difference not input by said step (c) based on a doppler frequency of a range-doppler cell containing said object; and (e) determining a position of said object from said summation output, said input one of said azimuth difference and said elevation difference, and said calculated one of said azimuth difference and said elevation difference.

Additionally, the objects of the present invention are achieved by providing an article of manufacture comprising: a computer usable medium having a computer readable program code means embodied therein for causing a computer to determine a position of an object using output from a radar system mounted on a body, the computer readable program code means including, first input code means for causing said computer to input a velocity vector of said body; second input code means for causing said computer to input a summation output associated with said object from said radar system; third input code means for causing said computer to input one of an azimuth difference and an elevation difference associated with said object from said radar system; converting code means for causing said computer to convert said velocity vector into a parameter representing a relationship between said body and said object; and determining code means for causing said computer to determine said position of said object from said summation output, said input one of said azimuth difference and said elevation difference, and said parameter.

The objects of the present invention are also achieved by providing an apparatus for determining a position of an object using output from a radar system mounted on a body, comprising: converting means for inputting a velocity vector of said body, and for converting said velocity vector into a parameter representing a relationship between said body and said object; and determining means for inputting a summation output associated with said object from said radar system, for inputting one of an azimuth difference and an elevation difference associated with said object from said radar system, and for determining a position of said object from said summation output, said input one of said azimuth difference and said elevation difference, and said parameter.

The objects of the present invention are further achieved by providing an apparatus for determining a position of an object using output from a radar system mounted on a body, comprising: converting means for inputting a velocity vector of said body, for inputting a summation output associated with said object from said radar system, for inputting one of an azimuth difference and an elevation difference associated with said object from said radar system, and for converting said velocity vector into one of said azimuth difference and said elevation difference not input based on a doppler frequency of a range-doppler cell containing said object; and determining means for determining a position of said object from said summation output, said input one of said azimuth difference and said elevation difference, and said one of said azimuth difference and said elevation difference converted from said velocity vector.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIG. 7($a$) illustrates the time line of inputs to the position processor of the conventional system illustrated in FIG. 2;

FIG. 7($b$) illustrates the time line of inputs to the position processor of the system according to the present invention illustrated in FIG. 6.

DETAILED DESCRIPTION OF EMBODIMENTS

Figure 5:
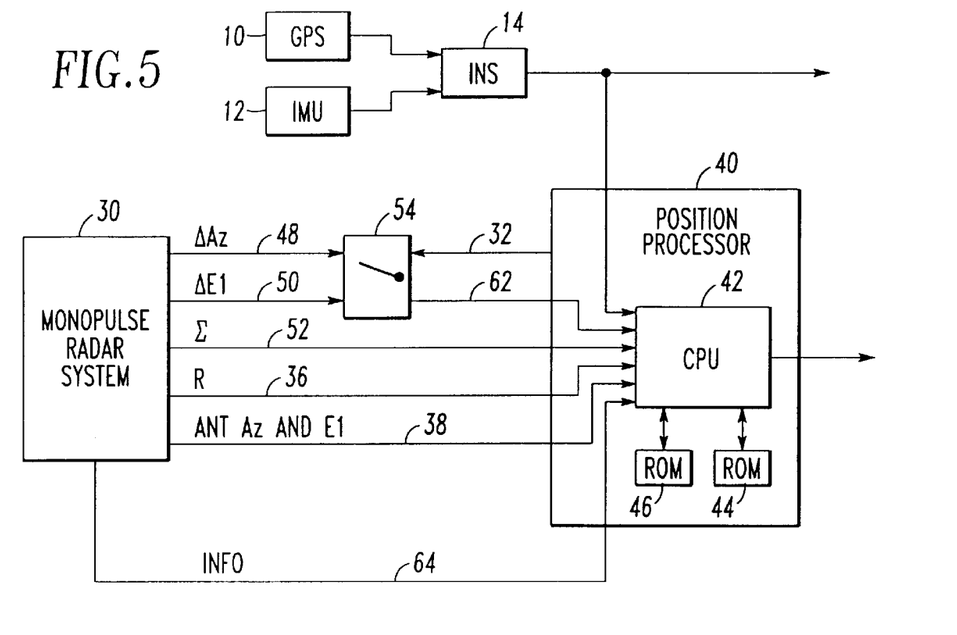
FIG. 5 illustrates a system for determining the position of an object according to the present invention.

FIG. 5 illustrates one embodiment of a system for determining the position of an object according to the present invention. For purposes of discussion, it will be assumed that the system according to the present invention is mounted on an aircraft; but, it should be understood that the present invention is not limited to mounting on an aircraft. The system shown in FIG. 5 illustrates the improvement resulting from applying the novel techniques of the present invention to the conventional system illustrated in FIG. 1. Similarly, the embodiment of the present invention illustrated in FIG. 6 and discussed later in the specification shows the improvement resulting from applying the novel techniques of the present invention to the conventional system illustrated in FIG. 2.

As illustrated in FIG. 5, one embodiment of the system according to the present invention uses the GPS 10 assisted INS 14 described in detail previously with respect to FIG. 3. A position processor 40 receives the output of the INS 14. The system according to the present invention further includes the monopulse radar system 30 which outputs the azimuth difference $\Delta Az$, the elevation difference $\Delta El$, the summation output 93, and the range R associated with an object on lines 48, 50, 52, and 36, respectively. Additionally, the monopulse radar system 30 outputs the antenna boresight azimuth and elevation on line 38, and the radar system information on line 64; wherein the radar system information includes the wavelength $\lambda$ of the output pulse of the monopulse radar system 30, the doppler frequency Fd of the range-doppler cell containing the object, and other known operating parameters of the monopulse radar system 30.

A switch 54 disposed near or forming a part of the monopulse radar system 30 receives the azimuth difference $\Delta Az$ and the elevation difference $\Delta El$ on lines 48 and 50, respectively. The switch 54 outputs one of the azimuth difference $\Delta Az$ and the elevation difference $\Delta El$ based on a control signal received on line 32 from the position processor 40. The position processor 40 receives the one of the azimuth difference $\Delta Az$ and the elevation difference $\Delta El$ output by switch 54 on line 62. The position processor 40 also receives the summation output $\Sigma$, the range R, and the antenna boresight azimuth and elevation on lines 52, 36, and 38, respectively.

Based on the outputs from the INS 14, the switch 54, and the monopulse radar system 30 received by the position processor 40, the position processor 40 determines the position of the object in antenna coordinates. The position processor 40 then converts the antenna coordinates into aircraft coordinates, and/or inertial coordinates as discussed previously with respect to the conventional systems of FIGS. 1 and 2. Additionally, the position processor 40 outputs a signal on line 32 to the switch 54 to control which of the azimuth difference $\Delta Az$ and the elevation difference $\Delta El$ the switch 54 outputs to the position processor 40. As shown in FIG. 5, the position processor 40 includes a CPU 42 connected to a RAM 44 and a ROM 46. Although the inputs to the position processor 40 are shown directly connected to the CPU 42, one skilled in the art will readily understand that any analog inputs would have to be converted to the digital domain by an analog-to-digital converter. Furthermore, instead of a CPU 42, ROM 46, and RAM 44, the position processor 40 may be replaced by equivalent logic circuits or a combination of logic circuits and at least one of CPU 42, ROM 46, and RAM 44. The operation of the system according to the present invention will be discussed in detail below.

Since the operation of the GPS 10, the IMU 12, the INS 14, and the monopulse radar system 30 are well known, the operation of these components will not be described. Also, for the purposes of discussion, it will be assumed that the control signal sent by the position processor 40 along the line 32 instructs the switch 54 to output the azimuth difference $\Delta Az$.

The RAM 44 of the position processor 40 stores the data input from the INS 14, the switch 54, and the monopulse radar system 30. Based on a program stored in the ROM 46, the CPU 42 processes the data stored in the RAM 44 to generate the position of the object in antenna coordinates, and to convert the position of the object in antenna coordinates into aircraft coordinates and/or inertial coordinates. Any intermediate values produced during the processing of the data stored in RAM 44 are also stored in RAM 44.

The position processor 40 utilizes the doppler frequency Fd of the range-doppler cell containing the object to determine the doppler angle $\theta$ between the velocity vector of the aircraft and a line connecting the aircraft and the range-doppler cell containing the object as shown in FIG. 4. The doppler frequency Fd of the range-doppler cell is known to the accuracy of the RF reference oscillator accuracy for the monopulse radar system 30 modified by a value which is roughly equivalent to the width of the frequency of the range-doppler cell. The doppler angle $\theta$ is calculated using the following equation:

$$\theta = \text{Arccos}(\lambda Fd/(2V)) \tag{4}$$

where $\theta$ is the doppler angle; $\lambda$ is the wavelength of the output pulse from the monopulse radar system 30, Fd is the doppler frequency of the range-doppler cell and V is the velocity of the aircraft from the INS 14.

Additionally, as discussed with respect to equation 2, the following expression defines a relationship between the doppler angle $\theta$ and the elevation El and azimuth Az of the range-doppler cell containing the object.

$$\text{Cos } (\theta) = \text{Cos } (El) \text{ Cos } (Az) \tag{5}$$

Accordingly, knowledge of the doppler angle $\theta$ and one of the elevation El and the azimuth Az of the range-doppler cell containing the object will allow calculation of the other of the elevation El and azimuth Az of the range-doppler cell containing the object. As mentioned above, it was assumed for purposes of discussion that the azimuth difference $\Delta Az$ was input by the position processor 40 as opposed to the elevation difference $\Delta El$. Accordingly, the elevation difference $\Delta El$ can be determined by solving for El in equation 5 as shown in equation 6, and differentiating equation 6 to obtain the equation for the elevation difference $\Delta El$, see equation 7.

$$El = \text{Arccos}(\text{Cos } (\theta)/\text{Cos } (Az)) \tag{6}$$

$$\Delta El = (\text{Sin } (\theta)d\theta - \text{Cos } (El) \text{ Sin } (Az)dAz)/(\text{Cos } (Az) \text{ Sin } (El)) \tag{7}$$

Note that based on (1) the antenna boresight azimuth and the antenna boresight elevation and (2) one of the azimuth difference $\Delta Az$ and elevation difference $\Delta El$ input by the position processor 40, the position processor can determine either the azimuth or elevation of the range-doppler cell containing the object by simply adding the input one of the azimuth difference $\Delta Az$ and the elevation difference $\Delta El$ to the corresponding one of the antenna boresight azimuth and the antenna boresight elevation.

Alternatively, if the position processor 40 inputs the elevation difference $\Delta El$, then the azimuth difference $\Delta Az$ could be calculated according to the following equation:

$$\Delta Az = (\text{Sin } (\theta)d\theta - \text{Cos } (Az) \text{ Sin } (El)dEl)/(\text{Cos } (El) \text{ Sin } (Az)) \tag{8}$$

Having determined the one of the azimuth difference $\Delta Az$ and the elevation difference $\Delta El$ not input from the monopulse radar system 30, the position processor 40 can then determine the position of the object in antenna coordinates in the same manner as the conventional system. Additionally, the position processor 40 converts the position of the object in antenna coordinates into aircraft and/or inertial coordinates in the same manner as the conventional system.

For either the system according to the present invention or the conventional system illustrated in FIG. 1, the antenna boresight location (the antenna boresight elevation and the antenna boresight azimuth) would be the same. Additionally, the azimuth difference $\Delta Az$ or elevation difference $\Delta El$ produced by the monopulse radar system 30 in the system of the present invention or the conventional system would have relatively the same degree of accuracy (the accuracy depending in part on the signal-to-noise ratio in the range-doppler cells). The error sources in the system of the present invention with respect to the conventional system are, therefore, predominantly in the accuracy of the velocity vector, and the monopulse null angles $\phi Az$ or $\phi El$. The monopulse null angle $\phi Az$ represents the angle of the intersection of the constant doppler curve Isodopp (see FIG. 4) and the monopulse null line associated with the azimuth difference $\Delta Az$ measurement of the monopulse radar system 30. The monopulse null angle $\phi El$ represents the angle of the intersection of the constant doppler curve Isodopp with the monopulse null line associated with the elevation difference $\Delta El$ measurement.

Figure 8:
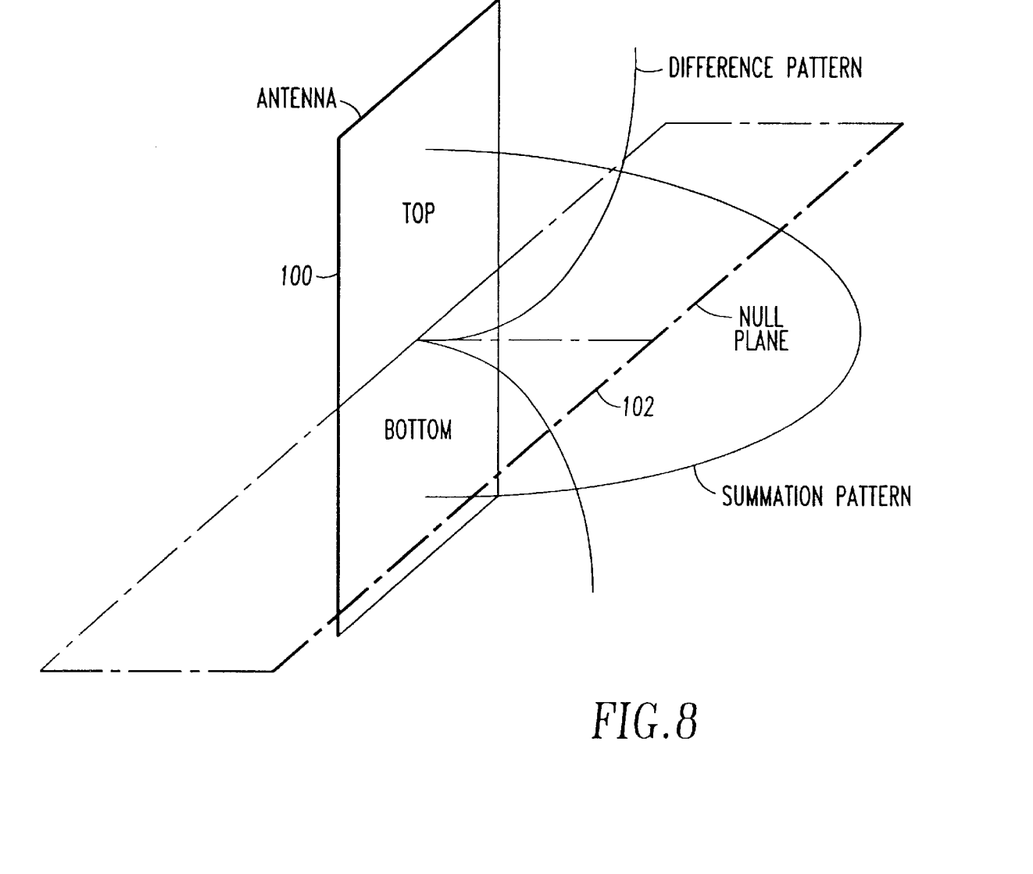
FIG. 8 illustrates an antenna of the monopulse radar system.

FIG. 8 illustrates an antenna 100 of the monopulse radar system 30 bisected into a top portion and a bottom portion by a null plane 102. The null plane 102 represents the region where the elevation difference $\Delta El$ measurement will return a zero value. Also shown in FIG. 8 are the difference pattern for the elevation difference $\Delta El$ measurement and the sum pattern for the summation output $\Sigma$ measurement. Similarly, another null plane exists with respect to the azimuth difference $\Delta Az$ measurement, but is not shown in FIG. 8 for ease of illustration reasons.

While FIG. 8 illustrates the null plane 102 intersecting the antenna 100 at 90°, as is well known, the orientation and position of the body and the antenna, the type of antenna, and operating parameters of the antenna define the orientation and position of the null plane 102 for the elevation difference $\Delta El$ measurement and the null plane for the azimuth difference $\Delta Az$ measurement. The position processor 40 receives the orientation and position of the body from the INS 14, and receives the orientation and position of the antenna and other antenna information as part of the radar information on line 64. Accordingly, the position processor 40 determines the null planes for the azimuth difference $\Delta Az$ and elevation difference $\Delta El$ measurements from this data. Furthermore, the position processor 40 can determine the intersection of these null planes with a beam pattern at a designated range. The lines formed by the intersection of the null planes with the beam pattern at the designated range are the monopulse null lines $NL_{AZ}$ and $NL_{EL}$ for the azimuth difference $\Delta Az$ and elevation difference $\Delta El$ measurements, respectively. Therefore, the position processor 40 derives the monopulse null lines $NL_{Az}$ and $NL_{E1}$ for the range R at which the object is detected.

The error bands created by errors in the range R measurement, the doppler angle $\theta$ measurement, and the monopulse null line $NL_{AZ}$ for the azimuth difference $\Delta Az$ intersect to form an error volume, which corresponds to the error when using the azimuth difference $\Delta Az$ from the monopulse radar system 30. This error volume is defined by the equation:

$$\Delta R * \Delta NL_{AZ} * \Delta\theta/\text{Sin } (\phi Az) \tag{9}$$

where $\Delta R$ represents the error band of the range measurement, $\Delta NL_{AZ}$ represents the error band of the monopulse null line $NL_{AZ}$, $\Delta\theta$ represents the error of the doppler angle $\theta$, and $\phi AZ$ is the monopulse null angle.

Similarly, the error bands created by errors in the range R measurement, the doppler angle $\theta$ measurement, and the monopulse null line $NL_{E1}$ for the elevation difference $\Delta El$ intersect to form an error volume, which corresponds to the error when using the elevation difference $\Delta El$ from the monopulse radar system 30. This error volume is defined by the equation:

$$\Delta R * \Delta NL_{E1} * \Delta\theta/\text{Sin } (\phi El) \tag{10}$$

where $\Delta R$ represents the error band of the range measurement, $\Delta NL_{E1}$ represents the error band of the monopulse null line $NL_{E1}$, $\Delta\theta$ represents the error of the doppler angle $\theta$, and $\phi El$ is the monopulse null angle.

As is well known, the error in the range and the monopulse null lines are known based on the specifications of the monopulse radar system 30.

The error $\Delta\theta$ in calculating the doppler angle $\theta$ is due to an error in the velocity vector V, and is given by the equation:

$$\Delta\theta = \mathrm{Cot}(\theta)\Delta V/V \qquad (11)$$

where $\Delta V$ represents the change in the velocity vector.

For typical state-of-the-art systems with quality inertial measurement systems having global position system inputs, the $\Delta V/V$ value can be very small amounting to less than 0.001. Thus, even for small doppler angles $\theta$ where $\mathrm{Cot}(\theta)$ is greater than 1.0, the system according to the present invention can provide reasonable doppler angle accuracy. Therefore, the error in the doppler angle $\theta$ is known based on the specifications of the INS 14.

Since the position and orientation of the null planes depend on factors which vary with the monopulse radar system 30, the position and orientation of the null planes, the monopulse null lines $\mathrm{NL}_{AZ}$ and $\mathrm{NL}_{E1}$, and the monopulse null angles $\phi\mathrm{Az}$ and $\phi\mathrm{El}$ cannot by given by general formulas. For a specific case, however, the generation of these formulas is merely a trigonomic problem well within the ordinary skill in the art. Accordingly, the position processor 40 determines the monopulse null lines $\mathrm{NL}_{AZ}$ and $\mathrm{NL}_{AZ}$ and the monopulse null angles $\phi\mathrm{Az}$ and $\phi\mathrm{El}$ based on these readily determinable equations.

Using the above data, the position processor 40 determines the error volume corresponding to using the elevation difference $\Delta\mathrm{El}$ measurement with equation (10) and determines the error volume corresponding to using the azimuth difference $\Delta\mathrm{Az}$ measurement with equation (9). Based on the results, the position processor 40 generates a control signal which instructs the switch 54 to output the azimuth difference $\Delta\mathrm{Az}$ and the elevation difference $\Delta\mathrm{El}$ having the smaller corresponding error volume.

As one skilled in the art will readily recognize, the error in the range measurement $\Delta R$ and the error in the doppler angle $\theta$ measurement $\Delta\theta$ should be the same for both equations (9) and (10). Therefore, the position processor 40 can eliminate the use of these variables when generating the control signal.

As a comparison between FIGS. 1 and 5 demonstrates, the present invention provides a reduction in the number of channels. In the conventional three-channel monopulse radar system, each of the summation output, the azimuth difference $\Delta\mathrm{Az}$, and the elevation difference $\Delta\mathrm{El}$ are output on their own individual channel. The system of the present invention, however, requires outputting only one of the azimuth difference $\Delta\mathrm{Az}$ and the elevation difference $\Delta\mathrm{El}$. Furthermore, the system of the present invention uses the azimuth difference $\Delta\mathrm{Az}$ or the elevation difference $\Delta\mathrm{El}$ output from the monopulse radar system which provides the greatest accuracy in determining the position of the range-doppler cell containing the object.

The system of the present invention further provides the same resolution and power as the conventional system illustrated in FIG. 1. Depending on the accuracy of the velocity vector, the doppler angle measurement accuracy may improve overall because the determination of the doppler angle $\theta$ may be more accurate than the value of the azimuth difference $\Delta\mathrm{Az}$ or the elevation difference $\Delta\mathrm{El}$ that it replaces. Accordingly, the system of the present invention can more accurately determine the position of the range-doppler cell containing the object.

Furthermore, the system of FIG. 5 provides improved performance characteristics compared to the system of FIG. 2. While both FIGS. 2 and 5 reduce the number of channels compared to FIG. 1, FIG. 2 requires sequentially and alternately switching between the azimuth difference $\Delta\mathrm{Az}$ and the elevation difference $\Delta\mathrm{E1}$ outputs. As a result, the PRF must be increased, lowering the maximum range and/or other performance parameters.

By contrast, the system of FIG. 5 does not require sequentially and alternately switching between the azimuth difference $\Delta\mathrm{Az}$ and the elevation difference $\Delta\mathrm{E1}$. Instead, the position processor 40 continuously inputs the azimuth difference $\Delta\mathrm{Az}$ until the elevation difference $\Delta\mathrm{El}$ provides a more accurate position determination. At which time, the position processor 40 switches to inputting the elevation difference $\Delta\mathrm{E1}$, and continually inputs the elevation difference $\Delta\mathrm{E1}$. Therefore, the system of FIG. 5 may operate at almost half the PRF of the system illustrated in FIG. 2 with corresponding increases in the maximum range and other performance parameters of the monopulse radar system 30.

Figure 6:
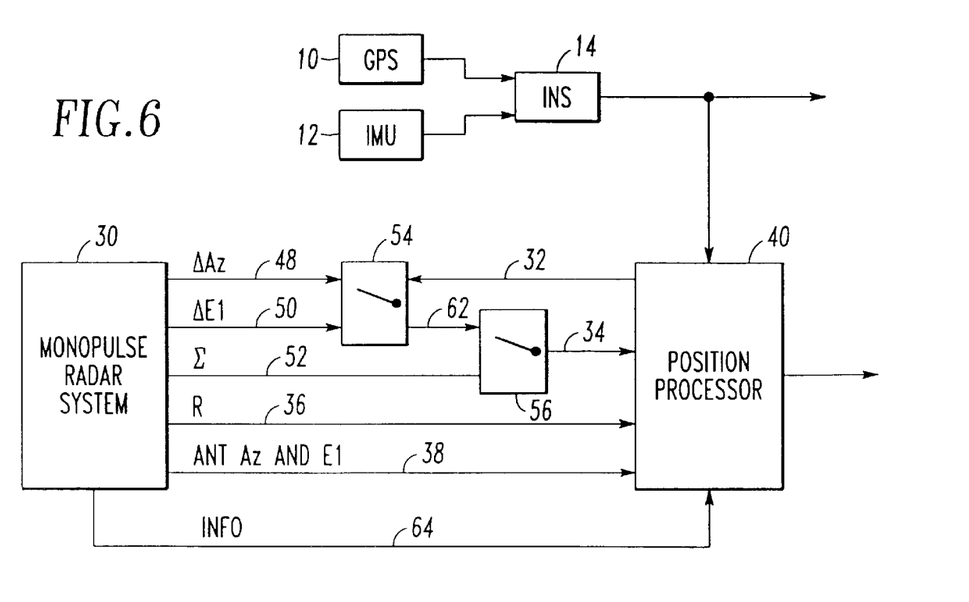
FIG. 6 illustrates another system for determining the position of an object according to the present invention.
Figure 7B:
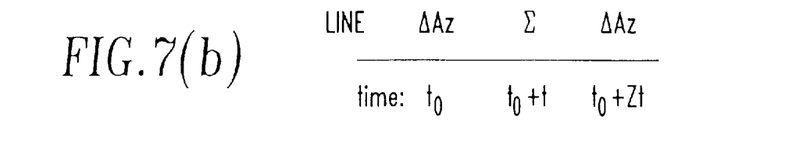

FIG. 6 illustrates another embodiment of the present invention. The embodiment of FIG. 6 differs from the embodiment of FIG. 5 in that the embodiment of FIG. 6 is a single channel system. To reduce the number of channels to one, a switch 56 has been added to the embodiment of FIG. 5 to create the embodiment of FIG. 6. The switch 56 receives the one of the azimuth difference $\Delta\mathrm{Az}$ and the elevation difference $\Delta\mathrm{El}$ output on line 62 by the switch 54, and further receives the summation output $\Sigma$ on line 52. The switch 56 sequentially and alternatively outputs the data received on lines 62 and 52. Assuming that the switch 54 outputs the azimuth difference $\Delta\mathrm{Az}$, FIG. 7(*b*) illustrates the output of the switch 56.

The output of the switch 56 is supplied to the position processor 40 on line 34. Like the switch 54, the switch 56 is disposed near or forms a part of the monopulse radar system 30. Except for a delay in receiving all the needed inputs, the position processor 40 operates on these inputs in the same manner as described above with respect to FIG. 5 to determine the position of the object. Therefore, the operation of this embodiment will not be described in detail.

Wherein the conventional system of FIG. 2 there were two channels, in the system of the present invention illustrated in FIG. 6 there is only a single channel. Since there is only a single channel, the summation output $\Sigma$ must alternate with either the azimuth difference $\Delta\mathrm{Az}$ or the elevation difference $\Delta\mathrm{El}$ on that channel. Other parameter values being constant, this causes a loss in the summation output power by a factor of 2 (−3dB); but does not effect the processing time line. As shown in FIG. 7(*a*), it takes until time $t_o + t$ for the position processor 72 of the conventional system illustrated in FIG. 2 to receive the summation output $\Sigma$, the azimuth difference $\Delta\mathrm{Az}$, and the elevation difference $\Delta\mathrm{El}$. By the same token, as shown in FIG. 7(*b*), the position processor 40 of the present invention receives the azimuth difference $\Delta\mathrm{Az}$ and the summation output $\Sigma$ at time $t_o + t$. The position processor 40 can then readily determine the elevation difference $\Delta\mathrm{El}$ and position of the object as described above.

A further advantage of the present invention is that in going to a single channel, a channel-to-channel calibration operation is not necessary since the data sees the same channel. The other advantages and benefits discussed above with respect to FIG. 5 also apply to this embodiment.

Instead of using the GPS 10 assisted INS 14. The conventional INS 70 can be substituted therefor in the above described embodiments. In these embodiments, the INS 70 would have to be periodically supplied with the outputs from the radar system 30 necessary for correcting the accuracy of the velocity measurement. Alternatively, a system merging the prior art and present invention could be developed wherein the position processor switches between operating according to the prior art and the present invention.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A method of determining a position of an object using output from a radar system mounted on a body, comprising:
   (a) inputting a velocity vector of said body;
   (b) inputting a summation output associated with said object from said radar system;
   (c) inputting one of an azimuth difference and an elevation difference associated with said object from said radar system;
   (d) converting said velocity vector into a parameter representing a relationship between said body and said object; and
   (e) determining a position of said object from said summation output, said input one of said azimuth difference and said elevation difference, and said parameter.

2. The method of claim 1, wherein
   said step (a) inputs said velocity vector from a global position system assisted inertial navigation system.

3. The method of claim 1, wherein step (d) converts said velocity vector into said parameter based on at least one operating parameter of said radar system.

4. The method of claim 1, wherein said (d) converts said velocity vector into a doppler angle representing an angle between the velocity vector and a line connecting said object and said body.

5. The method of claim 4, wherein said step (d) converts said velocity vector into said doppler angle based on a doppler frequency of a range-doppler cell containing said object.

6. The method of claim 1, wherein said step (e) comprises the steps of:
   (e1) calculating one of said azimuth difference and said elevation difference not input in step (c) based on said parameter; and
   (e2) determining said position of said object based on said summation output, said input one of said azimuth difference and said elevation difference, and said calculated one of said azimuth difference and said elevation difference.

7. The method of claim 1, wherein said step (e) determines said position of said object relative to said body.

8. The method of claim 1, wherein said step (e) determines said position of said object in global coordinates.

9. The method of claim 1, further comprising:
   (f) controlling step (c) to selectively input one of said azimuth difference and said elevation difference which would provide better accuracy in determining said position of said object.

10. The method of claim 1, wherein said body is an aircraft.

11. The method of claim 1, wherein said steps (b) and (c) perform said inputting from a monopulse radar system.

12. A method of determining a position of an object using output from a radar system mounted on a body, comprising:
   (a) inputting a velocity vector of said body from an inertial navigation system;
   (b) inputting a summation output associated with said object from said radar system;
   (c) inputting one of an azimuth difference and an elevation difference associated with said object from said radar system;
   (d) calculating one of said azimuth difference and said elevation difference not input by said step (c) based on a doppler frequency of a range-doppler cell containing said object; and
   (e) determining a position of said object from said summation output, said input one of said azimuth difference and said elevation difference, and said calculated one of said azimuth difference and said elevation difference.

13. An article of manufacture comprising:
   a computer usable medium having a computer readable program code means embodied therein for causing a computer to determine a position of an object using output from a radar system mounted on a body, the computer readable program code means including,
      first input code means for causing said computer to input a velocity vector of said body;
      second input code means for causing said computer to input a summation output associated with said object from said radar system;
      third input code means for causing said computer to input one of an azimuth difference and an elevation difference associated with said object from said radar system;
      converting code means for causing said computer to convert said velocity vector into a parameter representing a relationship between said body and said object; and
      determining code means for causing said computer to determine said position of said object from said summation output, said input one of said azimuth difference and said elevation difference, and said parameter.

14. The article of manufacture according to claim 13, wherein said first input code means causes said computer to input said velocity vector from a global position system assisted inertial navigation system.

15. The article of manufacture according to claim 13, wherein said converting code means causes said computer to convert said velocity vector into a doppler angle representing an angle between said velocity vector and a line connecting said object and said body.

16. The article of manufacture according to claim 15, wherein said converting code means causes said computer to convert said velocity vector into said doppler angle based on a doppler frequency of a range-doppler cell containing said object.

17. The article of manufacture according to claim 13, wherein said determining code means comprises:
   calculating code means for causing said computer to calculate one of said azimuth difference and said elevation difference not input by said computer based on said parameter; and
   position code means for causing said computer to determine said position of said object based on said summation output, said input one of said azimuth difference and said elevation difference, and said calculated one of said azimuth difference and said elevation difference.

18. The article of manufacture according to claim 13, wherein said determining code means causes said computer to determine said position of said object relative to said body.

19. The article of manufacture according to claim 13, wherein said determining code means causes said computer to determine said position of said object in global coordinates.

20. The article of manufacture according to claim 13, wherein said third input means causes said computer to input one of said azimuth difference and said elevation difference which would provide better accuracy in determining said position of said object.

21. The article of manufacture according to claim 13, wherein said computer usable medium is a read only memory.

22. An apparatus for determining a position of an object using output from a radar system mounted on a body, comprising:

converting means for inputting a velocity vector of said body, and for converting said velocity vector into a parameter representing a relationship between said body and said object; and determining means for inputting a summation output associated with said object from said radar system, for inputting one of an azimuth difference and an elevation difference associated with said object from said radar system, and for determining a position of said object from said summation output, said input one of said azimuth difference and said elevation difference, and said parameter.

23. The apparatus of claim 22, wherein said converting means inputs said velocity vector from a global positioning system assisted inertial navigation system.

24. The apparatus of claim 22, wherein said converting means converts said velocity vector into said parameter based on at least one operating parameter of said radar system.

25. The method of claim 22, wherein said converting means converts said velocity vector into a doppler angle representing an angle between said velocity vector and a line connecting said object and said body.

26. The method of claim 25, wherein said converting means converts said velocity vector into said doppler angle based on a doppler frequency of a range-doppler cell containing said object.

27. The method of claim 22, wherein said determining means comprises:

calculating means for calculating one of said azimuth difference and said elevation difference not input by said determining means based on said parameter; and position determining means for determining said position of said object based on said summation output, said input one of said azimuth difference and said elevation difference, and said calculated one of said azimuth difference and said elevation difference.

28. The method of claim 22, wherein said determining means determines said position of said object relative to said body.

29. The method of claim 22, wherein said determining means determines said position of said object in global coordinates.

30. The method of claim 22, further comprising:

control means for outputting a control signal which instructs a switch to selectively output one of said azimuth difference and said elevation difference which would provide better accuracy in determining said position of said object to said converting means.

31. The method of claim 22, wherein said body is an aircraft.

32. An apparatus for determining a position of an object using output from a radar system mounted on a body, comprising:

converting means for inputting a velocity vector of said body, for inputting a summation output associated with said object from said radar system, for inputting one of an azimuth difference and an elevation difference associated with said object from said radar system, and for converting said velocity vector into one of said azimuth difference and said elevation difference not input based on a doppler frequency of a range-doppler cell containing said object; and determining means for determining a position of said object from said summation output, said input one of said azimuth difference and said elevation difference, and said one of said azimuth difference and said elevation difference converted from said velocity vector.

33. An system for determining a target position, comprising:

a radar system mounted on a body which produces a summation output, an elevation difference and an azimuth difference corresponding to an object;

converting means for inputting a velocity vector of said body, and for converting said velocity vector into a parameter representing a relationship between said body and said object;

determining means for inputting said summation output from said radar system, for inputting one of said azimuth difference and said elevation difference from said radar system, and for determining a position of said object from said summation output, said input one of said azimuth difference and said elevation difference, and said parameter.

34. The system of claim 33, further comprising:

a global position system assisted inertial navigation system mounted on said body which produces said velocity vector of said body.

35. The system of claim 33, further comprising:

a switch receiving said elevation difference and said azimuth difference from said radar system and selectively outputting one of said elevation difference and said azimuth difference based on a control signal; and control signal generating means for generating said control signal such that said switch outputs, to said converting means, one of said azimuth difference and said elevation difference which would provide better accuracy in determining said position of said object.

36. The system of claim 33, wherein a processor forms said converting means and said determining means.

37. The system of claim 36, wherein a processor forms said converting means, said determining means, and said control signal generating means.

38. The system of claim 33, wherein said converting means and said determining means are logic circuits, respectively.

* * * * *